(12) United States Patent
Kott

(10) Patent No.: US 6,994,820 B2
(45) Date of Patent: Feb. 7, 2006

(54) METHOD OF FORMING A COMPRESSED COMPOSITE PRODUCT

(75) Inventor: Norbert Kott, Fort Langley (CA)

(73) Assignee: Weyerhaeuser Company, Federal Way, WA (US)

( * ) Notice: Subject to any disclaimer, the term of this patent is extended or adjusted under 35 U.S.C. 154(b) by 254 days.

(21) Appl. No.: 10/368,961

(22) Filed: Feb. 18, 2003

(65) Prior Publication Data

US 2004/0159981 A1    Aug. 19, 2004

(51) Int. Cl.
*B29C 43/22*    (2006.01)
*B29C 59/00*    (2006.01)
*B29C 67/00*    (2006.01)

(52) U.S. Cl. .......................... 264/489; 264/69; 264/71; 264/72; 264/109; 264/120; 264/491

(58) Field of Classification Search ........ 264/109–128, 264/69, 71, 72, 489, 491
See application file for complete search history.

(56) References Cited

U.S. PATENT DOCUMENTS 4,923,656 A * 5/1990 Held ........................... 264/70
6,312,632 B1   11/2001 Graf

FOREIGN PATENT DOCUMENTS

DE    196 02 536 A1    7/1996
WO    WO 92/15447 A1    9/1992

* cited by examiner

Primary Examiner—Stephen J. Lechert, Jr.

(57) ABSTRACT

The present invention is a method of forming a compressed product. The method includes introducing a material into a press that is oscillating between a compression phase and a release phase. The material has a compression recovery response time when compressed and released. The compressed product is formed by repeatedly compressing the material during the compression phase and releasing the material during the release phase.

18 Claims, 6 Drawing Sheets

METHOD OF FORMING A COMPRESSED COMPOSITE PRODUCT

FIELD OF THE INVENTION

This invention relates generally to methods of forming compressed products and, more specifically to a method of forming a compressed composite product with oscillating compression.

BACKGROUND OF THE INVENTION

Oriented strand board, parallel strand lumber and other engineered wood products produced from discrete wood elements are produced in a press by depositing a mat of resin coated wood elements within the press and applying a compressive force to the mat. Heat from a variety of sources is added to substantially cure the resin while the mat is within the press. The heat may be added in the form of microwave energy, radio frequency energy, steam injection or the like.

As depicted in FIG. 1, current press systems includes a pair of opposed platens 40a configured to continuously compress a material 38a into a desired shape. Adjacent each platen 40a is a press belt 37 running on a roller arrangement 35. The belt 37 and roller arrangement 35 combination allows movement of the material 38a through the platens 40a while the platens are continuously applying a compressive force to the material 38a. This method of forming a composite wood product is problematic in many ways.

The current continuous press designs impede the application of energy. The press belt, bearing arrangements and necessary lubrication materials represent a significant barrier for the application of heating energy to the product. The heating of the product via a hot platen technology results into an uneven heating profile which in turn yields an uneven density profile throughout the product.

The constant pressure applied also occasionally adversely affects the resulting product. The mat is generally an arrangement of wood elements formed in layers. When pressure is applied, often times there are pockets of air or moisture that gets trapped within the wood layers. As energy is applied, the natural moisture of the wood can form steam pockets in the regions of the trapped air. Subsequently, a blowout or other product defects result, thereby rendering the product unfit for its intended purpose.

SUMMARY OF THE INVENTION

The present invention is a method of forming a compressed product. The method includes introducing a material into a press that is oscillating between a compression phase and a release phase. The material has a compression recovery response time when compressed and released. The compressed product is formed by repeatedly compressing the material during the compression phase and releasing the material during the release phase.

The present invention further includes a method of forming a compressed wood product. The method includes introducing a mat assembly of resinated discrete wood elements into an oscillating press oscillating between a compression phase and a release phase. While the mat assembly is being formed into the compressed wood product, the temperature of the mat assembly is controlled.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
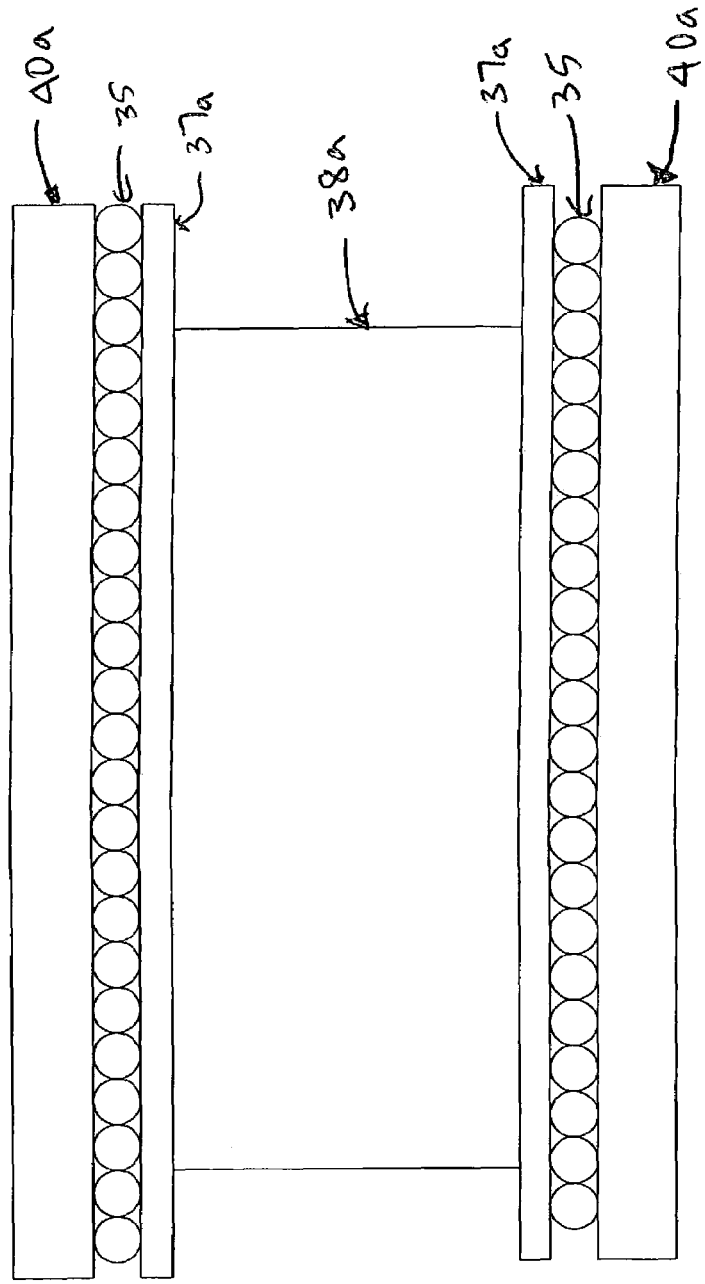
FIG. 1 is a schematic of a press section according to the prior art.

The present invention provides a system and method for forming a compressed material product using an oscillating pressing process. By way of overview, and with references to FIG. 2, one presently preferred embodiment includes a compressed material forming system 20. The compressed material forming system 20 includes an oscillating compression system 22 used to apply an oscillating compressive force to the material 38b. Further, a material temperature control system 24 is used to control the temperature of the material 38b during the forming process. A material transport system 26 is included to move the material through the compressed material forming system 20 as desired. Additionally, a material treatment system 28 is optionally present to treat the material 38b during the forming process. Specific details of the compressed material forming system 20 are described with more particularity below.

The material 38b to be subjected to the treatment of the invention desirably comprise a mat assembly 30 (FIG. 3) of resinated discrete wood elements which can be subjected simultaneously to pressure and heat to form cured, consolidated products 32. The wood elements may be in any known form. Suitable, non-limiting examples of the wood elements usable with this present invention are wood chips, flakes, strands, veneers, fibers, particles and wafers.

The products 32 (FIG. 3) preferably produced by the present invention are any known consolidated composite wood products presently known in the industry. Suitable product 32 examples include, but are not limited to particleboard, oriented strand board, fiberboard, waferboard, plywood, laminated veneer lumber, parallel strand lumber, and laminated beams.

The moisture content of the material 38b prior to treatment by the process of the invention generally will broadly range from about 0% to about 20% by weight. However, this moisture content range is merely a general guideline, and may be departed from. Optimum moisture content for material 38b is preferably determined on a case-by-case basis and it is within the skill of the art to correlate moisture levels with mat assembly 30 dimensions in order to make such determinations. It is possible to treat material 38b having a moisture content approaching zero, but the limited plasticity of wood under such conditions make this less desirable. The moisture content may be augmented by employing a water-containing adhesive.

The resin to be employed in the practice of this invention as it relates to wood is preferably an alkaline phenolic resin. However, it may be any adhesive whose rate of cure is accelerated by the application of heat. Water-soluble and non-water-soluble alkaline and acidic phenolic resins, resorcinol-formaldehyde resins, urea-formaldehyde resins, and isocyanate resins, for example, can be employed. The resin may be applied to material 38b in any desired amount. When employing long wood strands, the resin content will often range from about 1 to about 10% of the dry weight of the wood. Most often, the resin will be applied in an amount ranging from about 2 to about 5% of the dry weight of the wood.

The oscillating press system 22 may use a variety of known structures to induce the oscillating motion of the platens 40b and such structures are not intended to limit the scope of the present invention. For example, the oscillation may be induced by a controller 27 (FIG. 5) configured to actuate a pneumatic or hydraulic actuated cylinder (not shown). Likewise, the controller 27 may be configured to operate a suitable electromagnetic drive mechanism to induce the oscillating motion.

The controller 27 is suitably arranged to perform in a number of acceptable manners. For example, in one embodiment, it is performed by a processor or microprocessor (not shown) arranged to perform suitable operations. Any processor known in the art is acceptable, without limitation, a Pentium®—series processor available from Intel Corporation or the like. Alternatively, control of the platens 40b is performed by an electronic computer chip, hydraulic control systems, or is performed manually. Accordingly, the scope of the present invention shall not be limited by the manner in which the oscillating motion is generated.

Figure 3:
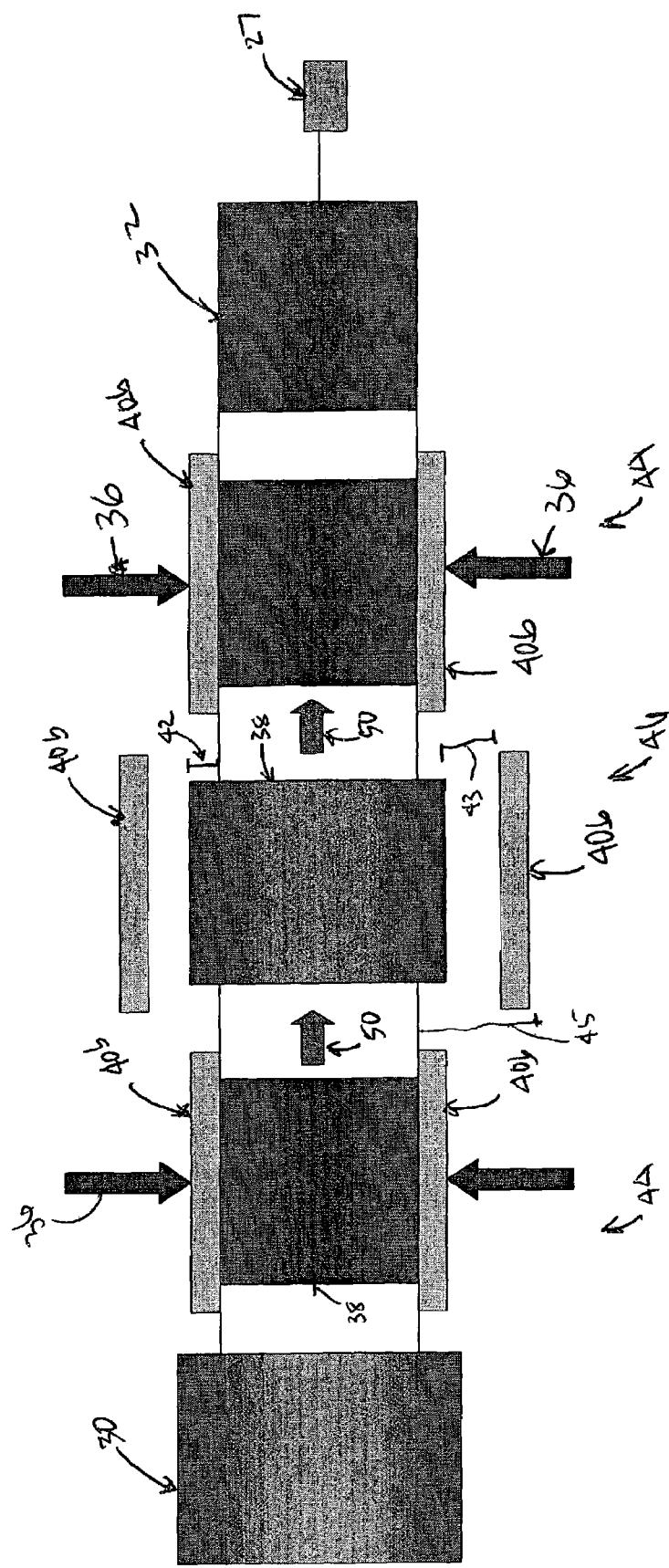
FIG. 3 is a schematic of the oscillating pressing process according to an aspect of the present invention.
Figure 4:
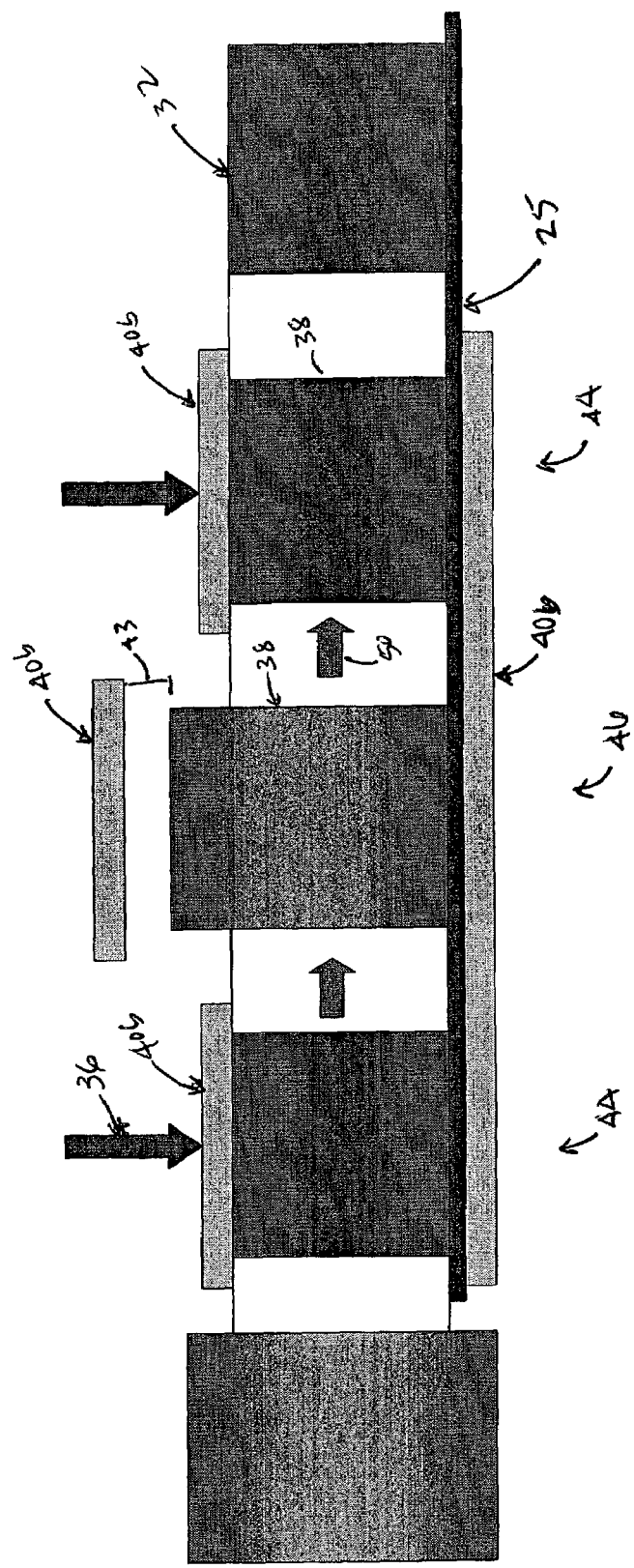
FIG. 4 is a schematic of another aspect of the oscillating pressing process according to an aspect of the present invention.
Figure 5:
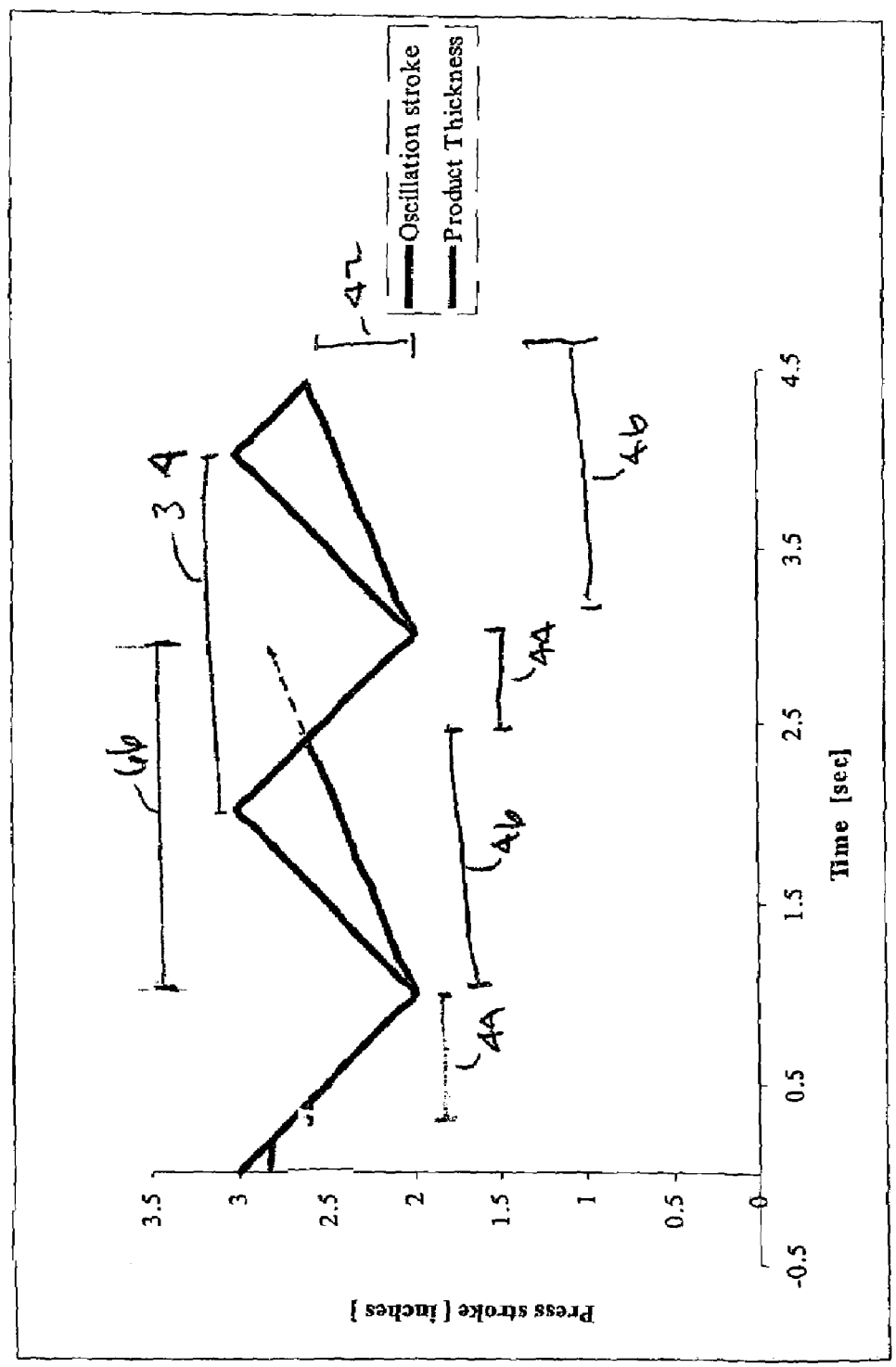
FIG. 5 is a graphical illustration of the relation between press stroke and material thickness over time in accordance with the present invention; and, FIG. 6 is a side view of the press platens in accordance with an aspect of the present invention.

FIGS. 3–5, illustrate an oscillating press cycle 34 of the oscillating press system 22. In accordance with the present invention, a single oscillating press cycle 34 includes one full compression phase 44 and one full release phase 46. The compression phase 44 is the phase of the oscillating press cycle 34 wherein the material 38b is under compressive forces from the platens 40b. Conversely, the release phase 46 is the phase of the oscillating press cycle 34 wherein the material 38b is substantially completely free from press applied compressive forces.

The release phase 46 is generated by suitably controlling the motion of at least one of the platens 40b relative to the material 38b. More specifically, after the compression phase 44, at least one of the platens 40b is moved away from the material 38b at a rate that is faster than the rate at which the material 38b is expanding upon release of the compressive forces. During the release phase 46, the material 38b will expand within an elastic region 42 at a given expansion rate. The amount of time required for the material 38b to expand to substantially a pre-compressed dimension is the compression recovery response time 66. As will also be appreciated by those skilled in the art, many factors will affect the compression recovery response time 66. For example, without limitation, material dimension, material composition, resin cure state (if relevant), the amount of compression applied to the material 38b, and the size of the desired elastic region 42 are all factors having an affect on the compression recovery response time 66.

The oscillating press cycle 34 is preferably selected to release the material during the release phase 46. In a particular embodiment, the oscillating press cycle 34 occurs at a frequency wherein the release phase 46 is less than the compression recovery response time 66 for the material 38b. More specifically, at least one platen 40b is suitably controlled to release the material 38b and subsequently recompress the material 38b at a rate faster than the material's compression recovery response time 66. As discussed above, a variety of factors affect the material's compression recovery response time 66. As such, the determination of a suitable compression recovery response time 66 for a given material is preferably determined through experimentation by those skilled in the art.

Although the scope of the present invention is not intended to be limited by the range of frequencies for the release phase 46, a preferably range of frequencies has been found to achieve desirable results when used in accordance with the present invention. In a particular embodiment, the oscillating press cycle 34 of the present invention is preferably operated between about 1 Hz to about 400 Hz.

As best seen in FIG. 3, a compression vector 36 depicts the resultant motion vector of the platens 40b at a moment in time substantially equal to the initiation of the compression phase 44. In a presently preferred embodiment, the compression vector 36 is substantially perpendicular to a material flow direction 50 within the oscillating pressing system 20. In this fashion, for a compressed material forming system 20 moving material 38b along a horizontal path, as indicated by direction arrow 50, the compression vector 36 would be substantially vertically oriented.

In accordance with this invention, a relief region 43 is created during the release phase 46 as the platens 40b pulls away from the material 38b at a rate faster than the material 38b is expanding. As best seen in FIG. 5, the stroke 62 of the platens 40b relative the material thickness 64 is suitably chosen to produce, among other things, the desired relief region 43. Those skilled in the art will appreciate that the relief region 43 is preferably sized to accommodate a suitable release phase 46. Additionally, the relief region 43 is sized to allow repositioning of the platens 40b without affecting the movement of the material 38b through the compressed material forming system 20.

Figure 6:
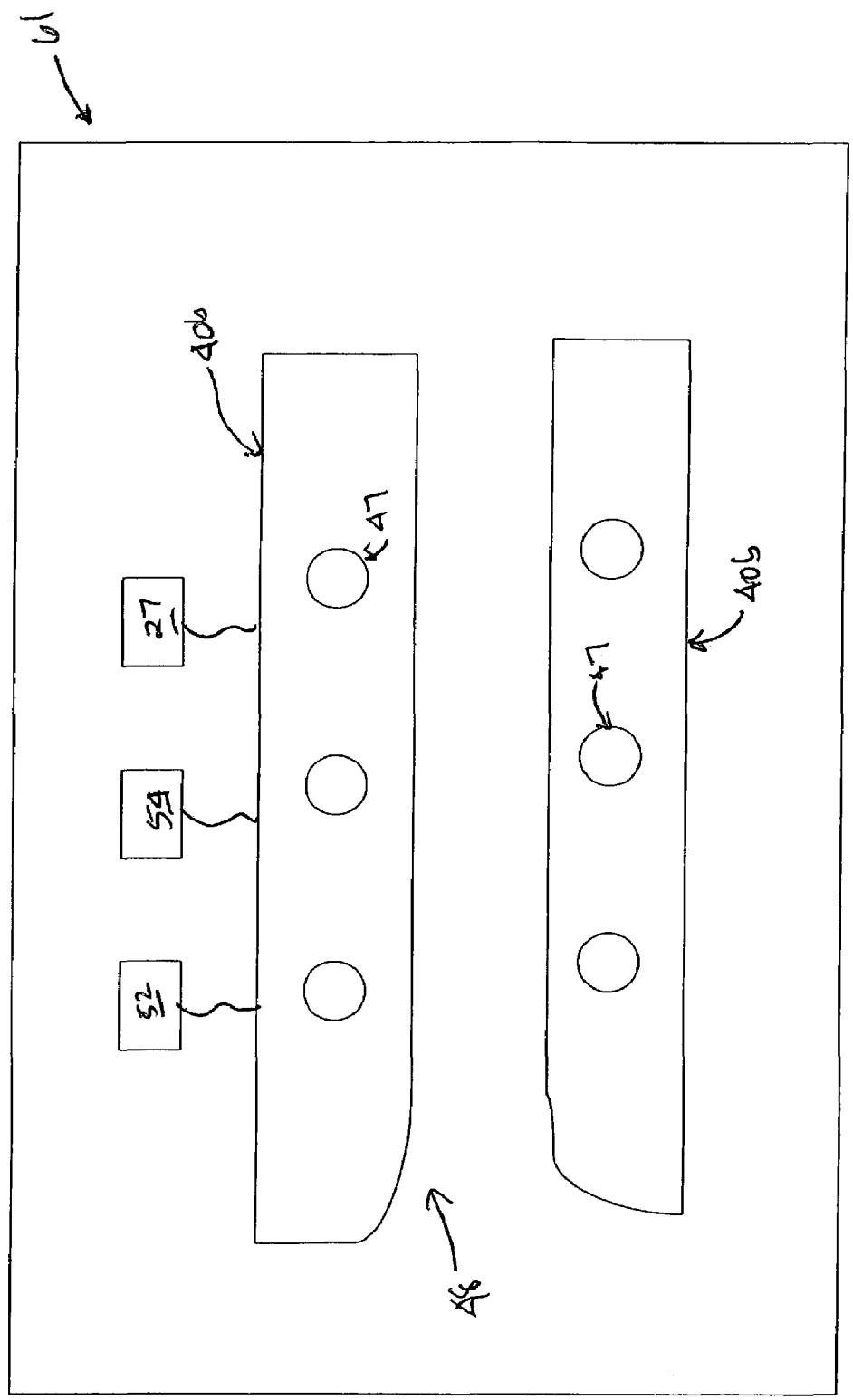

FIG. 6 depicts an aspect unique to the present invention. The platens 40b are configured to directly contact the material 38b during the pressing process. It should be noted, however, that platens 40b may be lined with a material, such as stainless steel (not shown), to help control microwave energy distribution, if relevant. The temperature control system 24, discussed in more detail below, is suitable configured to eliminate the need for heating of any platen lining material (not shown) to achieve adequate temperature control of the material 38b.

The platens 40b are typically aluminum or other material formed to include a tapered entrance section 48 configured to receive the mat assembly 30 as it enters the oscillating pressing system 20. The amount of the taper is suitably determined by those skilled in the art. However, in a particular embodiment of the present invention, a taper of about 7 degrees was found to be sufficient. However, platens 40b with entrance regions 48 having greater or lesser tapers are considered within the scope of this invention. Additionally, platens 40b with entrance regions 48 located at opposed ends of the platens 40b are also within the scope of this invention (not shown).

The temperature control system 24 in optionally in communication with at least one of the platens 40b, and includes structure and components used to apply energy to the material 38b in order to control the temperature of the material 38b. For example, the temperature control system 24 may be used to bring the material temperature up to a desired temperature, such as a resin cure temperature. Conversely, the temperature control system 24 may be used to selectively cool the material 38b. Still further, the temperature control system 24 may be used to both selectively heat and selectively cool the material in accordance with certain aspects of this invention.

The temperature control system 24 includes a temperature control unit 54 that is suitably configured to supply the energy to be used in the specific embodiment. The temperature control unit 54 may take many forms commonly known by those skilled in the art. For example, the temperature control unit 54 may be a microwave generator, radio frequency generator, steam injection generator, hot platen, cold platen, hot fluid generator, cold fluid generator or combinations thereof. For simplicity, the temperature control unit 54 is shown in communication with only on of the platens 40b. However, this configuration is not intended to limit the scope of the invention. Rather, those skilled in the art will appreciate that the temperature control unit 54 may be in communication with either platen 40b or both platens 40b. Additionally, the temperature control unit 54 may suitably be configured to apply energy along the material's face or side. Still further, the temperature control system 24 may be employed in a pre-press, in-press or post press arrangement.

Those skilled in the art will appreciate, the temperature control unit 54 includes all known structure necessary to utilize the temperature control unit 54. More specifically, if the temperature control unit 54 is a microwave generator, a suitable wave guide generator with suitable microwave windows (not shown) are part of the temperature control unit 54. Similar structures will be used where the temperature control unit 54 is a radio frequency generator or the like. When a steam generator is used, suitable hose and fittings (not shown) will likewise be used and are considered within the scope of this invention.

The material transport system 26 of the present invention may take various forms. Regardless of the form, those skilled in the art will appreciate the function of the material transport system 26 is to move the material 38b through the oscillating pressing system 20. The present invention may use any known material transport system 26 currently known in the art. For example, an external tractor means 33 may be used to pull the material through the press. Additionally, the material transport system 26 may be configured to force the material through the press by effectively pushing the material 38b into the press. Additionally, the material transport system may include structure that both push and pull the material 38b through the press. These structures are well known in the art and as such, a detailed description is not included in this discussion.

In FIG. 5, an alternative material transport system 26 is disclosed. More specifically, a belt or conveyor system 25 is shown. The conveyor system 25 is arranged to support and otherwise carry the material 38b through the oscillating pressing system. Suitable conveyor systems 25 are well known in the art, and as such are not discussed in detail in the present application. Those skilled in the art will appreciate that conveyor system 25 may be configured to substantially stop moving during the compression phase 44 and to move during the release phase 46. Alternatively, the conveyor system 25 may be substantially constantly moving throughout the compression phase 44 and the release phase 46.

Figure 2:
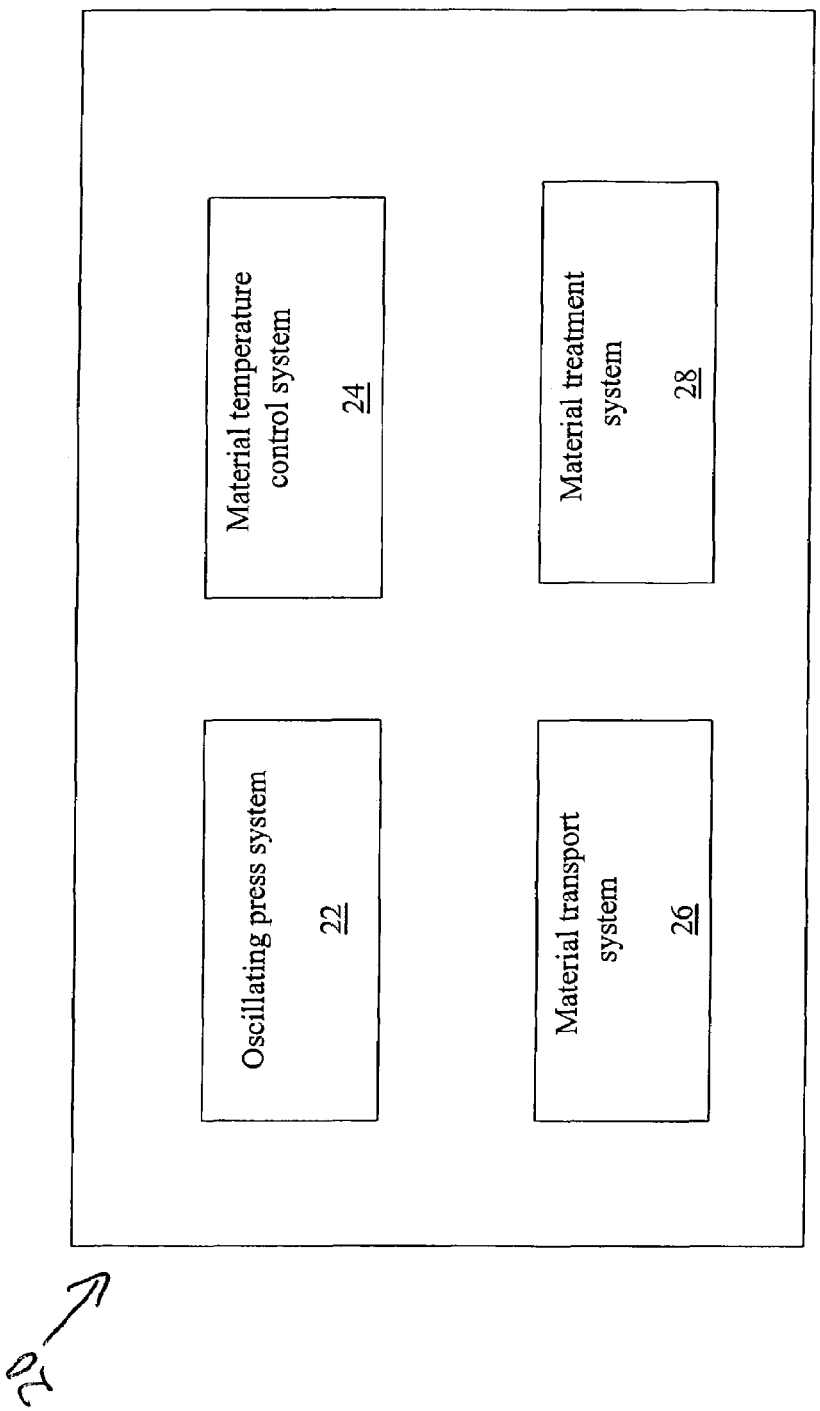
FIG. 2 is a system diagram of the oscillating pressing process according to an embodiment of the present invention.

With specific reference to FIGS. 2 and 3, the material treatment system 28 is preferably configured to treat the material 38b while the material is within the oscillating pressing system 20. The material treatment system 28 includes the addition suitable dyes or colorant materials, fire retardant materials, or preservative materials. However, the nature of the product added by the material treatment system 28 is not intended to limit the scope of the present invention. Consequently, any suitable product may be introduced by the material treatment system 28.

A material treatment unit 52 is suitably configured to control introduction of any treatment product. The form of the material treatment unit 52 is not intended to limit the present invention. Thus, any known structure may be used as a material treatment unit 52. For example, the material treatment unit may be a reservoir with suitable pumps, metering devices, sensing devices etc. commonly used with the temporary storage and disposition of the various treatment products according to this invention.

As with the temperature control unit 54 discussed above, the material treatment unit 52 suitably includes any structure necessary to enable the material treatment unit 52 to function as it is intended. For example, the material treatment unit 52 includes any hose, conduit, nozzle, diffuser or pathway utilized by the material treatment unit 52 in the delivery of the treatment product to the material 38b.

In a presently preferred embodiment the material treatment system 28 is configured to introduce the product onto the material 38b within the oscillating pressing system 20 during the release phase 46. However, the material treatment system 28 may be configured to introduce the product before, during or after the material is within the compression section of the oscillating pressing system 20.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of compressing a material to form a compressed product, comprising:
   introducing the material into a press having platens on opposing sides of the material wherein at least one of the platens oscillate between a compression phase and a release phase, the material having a compression recovery response time;
   compressing the material during the compression phase;
   releasing the material during the release phase such that during said release phase at least one of said platens is not in contact with said material.

2. The method of claim 1, wherein the release phase is less than the compression recovery response time for the material and wherein during said release phase at least one platen is moved away from said material at a rate which is faster than the compression recovery response time for the material.

3. The method of claim 1, wherein the oscillation frequency occurs at a frequency of about 1 Hz to about 400 Hz.

4. The method of claim 1, further comprising controlling the temperature of the material while the material is within the press by at least one of a heating the material or cooling the material.

5. The method of claim 4, wherein controlling the temperature of the material includes applying at least one of a steam injection, microwave energy, radio frequency, hot platen, cold platen, hot fluid and cold fluid.

6. The method of claim 1, wherein the material is a mat assembly of resinated discrete wood elements.

7. The method of claim 6, wherein the wood element is at least one of a chip, flake, strand, veneer, fiber, particle and wafer.

8. The method of claim 1, wherein a vector of the compression force applied by the oscillating press is oriented substantially perpendicular to a direction of motion of the material through the oscillating press.

9. The method of claim 1, further comprising applying an additional product onto the material.

10. The method of claim 9, wherein the additional product includes at least one of a fire retardant product, coloring product, dye product and preservative product.

11. The method of claim 1, further comprising transporting material through the oscillating press during the release time.

12. The method of claim 1, wherein the compressed product is at least one of an oriented strand board, plywood, oriented strand lumber, oriented veneer lumber, fiber board, wafer board and laminated beam.

13. A method of forming a compressed product, comprising:
   (a) introducing a mat assembly of resinated discrete wood elements into a press having a platen, the platen oscillating between a compression phase and a release phase, the mat assembly having a compression recovery response time;
   (b) compressing the mat assembly during the compression phase;
   (c) releasing the mat assembly during the release phase;
   (d) repeating steps (a) and (b) until such time as the product is formed.

14. The method of claim 13, further comprising controlling the temperature of the mat assembly within the press by at least one of a heating the mat assembly or cooling the mat assembly.

15. The method of claim 14, wherein controlling the temperature of the mat assembly includes applying at least one of a steam injection, microwave energy, radio frequency, hot platen, cold platen, hot fluid and cold fluid.

16. The method of claim 13, wherein the resinated discrete wood products are at least one of a chip, flake, strand, veneer, fiber, particle and wafer.

17. The method of claim 13, wherein the compressed product is at least one of an oriented strand board, plywood, oriented strand lumber, oriented veneer lumber, fiber board, wafer board and laminated beam.

18. The method of claim 13, further comprising transporting the mat assembly through the press via movement of the platen in a lateral direction.

* * * * *